United States Patent
Wagner

(10) Patent No.: US 8,197,170 B2
(45) Date of Patent: Jun. 12, 2012

(54) ANTI-CROSS THREADING SCREW

(75) Inventor: Frank Wagner, Großen Buseck (DE)

(73) Assignee: Kamax-Werke Rudolf Kellermann GmbH & Co. KG (DE)

( * ) Notice: Subject to any disclaimer, the term of this patent is extended or adjusted under 35 U.S.C. 154(b) by 348 days.

(21) Appl. No.: 12/558,876

(22) Filed: Sep. 14, 2009

(65) Prior Publication Data

US 2010/0068003 A1 Mar. 18, 2010

(30) Foreign Application Priority Data

Sep. 16, 2008 (DE) .................. 10 2008 042 141

(51) Int. Cl.
*F16B 35/00* (2006.01)

(52) U.S. Cl. .......................... 411/386; 411/412

(58) Field of Classification Search ............... 411/386, 411/411–413
See application file for complete search history.

(56) References Cited

U.S. PATENT DOCUMENTS

| | | | | |
|---|---|---|---|---|
| 2,021,704 A * | 11/1935 | Thatcher et al. | ............ | 411/423 |
| 3,124,408 A * | 3/1964 | Oestereicher | ............ | 439/741 |
| 4,258,607 A * | 3/1981 | McKewan | ............ | 411/417 |
| 4,854,794 A | 8/1989 | Oertel | | |
| 4,981,406 A * | 1/1991 | Weiss et al. | ............ | 411/386 |
| 5,609,455 A * | 3/1997 | McKewan | ............ | 411/386 |
| 5,730,566 A | 3/1998 | Goodwin et al. | | |
| 5,791,849 A | 8/1998 | Goodwin et al. | | |
| 5,997,231 A | 12/1999 | Goodwin et al. | | |
| 6,062,786 A * | 5/2000 | Garver et al. | ............ | 411/386 |
| 6,158,938 A | 12/2000 | Savoji | | |
| 6,162,001 A | 12/2000 | Goodwin et al. | | |
| 6,296,432 B1 | 10/2001 | Kato | | |
| 6,516,650 B1 | 2/2003 | Watanabe | | |
| 6,561,741 B2 | 5/2003 | Garver | | |
| 6,666,638 B2 * | 12/2003 | Craven | ............ | 411/413 |
| 6,685,411 B2 * | 2/2004 | Kato | ............ | 411/386 |
| 6,796,761 B2 | 9/2004 | Mizuno et al. | | |
| 7,367,768 B2 * | 5/2008 | McGovern et al. | ............ | 411/412 |
| 7,866,930 B2 * | 1/2011 | Murase et al. | ............ | 411/386 |

FOREIGN PATENT DOCUMENTS

| | | |
|---|---|---|
| DE | 36 01 389 A1 | 7/1987 |
| DE | 696 10 838 T2 | 6/2001 |
| DE | 60029393 T2 | 7/2007 |
| EP | 0 942 181 A2 | 9/1999 |
| WO | WO 97/04241 A1 | 2/1997 |

OTHER PUBLICATIONS

Bossard: "Handbuch der Verschraubungstechnik", expert-verlag, pp. 171-172, item 6.3.

* cited by examiner

*Primary Examiner* — Flemming Saether
(74) *Attorney, Agent, or Firm* — Thomas, Kayden, Horstemeyer & Risley, LLP

(57) ABSTRACT

An anti-cross threading screw (1) includes a first threaded portion (4) including a first thread (5) having a first outer diameter (6) and a first pitch (9) and a second threaded portion (12) having a second thread (13) having second outer diameter (18) and a second pitch (21). The second threaded portion (12) is designed as an anti-cross threading portion. The second thread (13) has enlarged an thread crest (15). The second outer diameter (18) of the second thread (13) is smaller than the first diameter (6) of the first thread (5). The first pitch (9) of the first thread (5) is different than the second pitch (21) of the second thread (13).

19 Claims, 15 Drawing Sheets

ANTI-CROSS THREADING SCREW

CROSS REFERENCE TO RELATED APPLICATIONS

This application claims priority to co-pending German Patent Application No. DE 10 2008 042 141.3 entitled "Selbstzentrierende Schraube", filed Sep. 16, 2008.

FIELD OF THE INVENTION

The present invention generally relates to an anti-cross threading screw.

Especially, the present invention relates to an anti-cross threading screw including two threaded portions.

Anti-cross threading screws serve to reliably attain a threaded connection between the outer thread of a screw and a corresponding inner thread of a nut or of another component while counteracting the negative effects of misalignment of the axis of the screw with respect to the axis of the nut and of the other component, respectively.

BACKGROUND OF THE INVENTION

An anti-cross threading screw and a method of producing it are known from PCT Application WO 97/04241 corresponding to U.S. Pat. Nos. 5,730,566, 5,791,849, 5,997,231 and 6,162,001 as well as German Patent No. DE 696 10 838 T2. The known anti-cross threading screw includes a head, a shank and a threaded portion including a thread having a pitch, the threaded portion facing the free end of the screw. The thread and its pitch correspond to the inner thread of a corresponding nut. The threaded portion is designed to be continuous in an axial and a radial direction, and it includes a rounded thread crest in the region of its portion facing the free end of the screw. The rounded thread crest at least extends over one revolution of the thread, meaning about at least 360°. This part of the threaded portion being continuous in an axial and a radial direction serves as a self-centering portion. Due to the rounded shape and the outer diameter being decreased compared to a "usual" thread, the outer diameter of the screw during continued tightening starting from a misaligned position can be aligned with respect to the inner thread of the nut in a way to correct cross threading without elastic and plastic deformation of the thread. Preferably, the threaded portion of the "usual" thread as well as the rounded beginning portion are produced by one single special rolling tool including rolling portions corresponding to the two different portions of the thread.

Another anti-cross threading screw is known from European Patent Application No. EP 0 942 181 A2 corresponding to U.S. Pat. No. 6,158,938. The screw includes a head, a shank and a threaded portion having a thread and a pitch, the threaded portion facing the free end of the screw. The threaded portion serves to attain a threaded connection with a corresponding inner thread of a component in a usual way. In the region of its free end, the screw includes a diminished centering portion (see FIGS. 2 and 6). The diminished centering portion may also include spaced apart cams instead of a thread being continuous in a radial direction, the cams being located directly adjacent to the remaining thread and in a way that they have the same pitch.

Another anti-cross threading screw is known from U.S. Pat. No. 6,796,761 B2. According a special embodiment illustrated in FIGS. 12 and 13, the screw includes two axially spaced apart threaded portions, namely a first threaded portion facing the head of the screw and a second threaded portion facing the free end of the screw. A smooth shank portion is arranged between the threaded portions. The shank portion has an outer diameter being identical to the outer diameter of the second threaded portion. The first outer diameter of the first thread of the first threaded portion is substantially greater than the second outer diameter of the second thread of the second threaded portion. The actual self-centering function is supplied by the first threaded portion including a conical portion extending over a plurality of rotations of the thread and having a rounded thread crest and rounded flanks. The thread crest of the second threaded portion facing the free end of the screw however has a normal design, meaning it is rather sharp-edged. According to the description in column 5, line 23-27, the pitches of the threads are identical. The following sentence mentions that the pitches may also be different from each other. However, this has no substantial effect on the functionality of the known screw since the thread of the second threaded portion is substantially smaller than the inner thread of the corresponding component to be connected to the screw such that there is no engagement between these threads. The inner thread of the component corresponds to the outer thread of the first threaded portion.

Further self-centering screws are also known from U.S. Pat. No. 6,516,650 B1 as well as U.S. Pat. No. 6,561,741 B2.

A screw for producing a threaded connection with a nut or with a different component including a corresponding inner thread is known from German Patent Application No. DE 36 01 389 A1 corresponding to U.S. Pat. No. 4,854,794. To prevent the threaded connection from being unintentionally loosened, the thread of the screw has a different pitch than the tread of the corresponding component. In this way, during tightening of the connection in the sense of screwing the outer thread of the screw into the inner thread of the corresponding component, one produces an increasing frictional moment leading to a jamming effect resulting in the threaded connection being secured in the tightened position.

Another prior art document generally describing how screws are produced is the German technical book Bossard: "Handbuch der Verschraubungstechnik", expert-verlag, pages 171-172, item 6.3.

SUMMARY OF THE INVENTION

The present invention relates to an anti-cross threading screw. The screw includes a first threaded portion including a first thread having a first outer diameter and a first pitch and a second threaded portion having a second thread having second outer diameter and a second pitch. The second threaded portion is designed as an anti-cross threading portion. The second thread has an enlarged thread crest. The second outer diameter of the second thread is smaller than the first diameter of the first thread. The pitch of the first thread is different than the second pitch of the second thread.

Misalignment of the axis of a screw with respect to the axis of a component including an inner thread which is intended to be connected to the screw may lead to damages of the thread of the screw and of the component during continued tightening of the threaded connection such that the treaded connection does not correctly fulfill its function and needs to be replaced. This effect of so called "cross threading" is of special importance in the art. During cross threading, a lack of a collinear arrangement of the axes of the corresponding threads leads to the threads engaging one another with an offset corresponding to half the pitch of the threads. Even slight misalignment of the axes may lead to cross threading, for example in case the first outer thread of the screw (which does not have the full height) does not perfectly engage the conical first thread of the inner thread of the component. Especially, high numbers of rotations during tightening for reducing assembly times easily lead to seizing effects which may partly or completely destroy the first revolutions of the threads. In this way, the screws and/or the nuts become unusable. In case of threads of nuts which are hard to be accessed, this may lead to great subsequent damages since it is possible that the entire component in which the inner thread is located has to be replaced.

With the novel anti-cross threading screw, it is possible to effectively correct misalignment between the outer thread of the screw with respect to the corresponding inner thread of the component or nut during tightening. Thus, the novel self-centering screw realizes the self-centering function without having to change the design of the "usual" thread serving to produce the actual threaded connection with a corresponding inner thread of a nut or of a different component. The "usual" thread—which preferably is a usual metric thread—does not have to be changed compared to screws not having a self-centering function such that it is possible to produce the thread with a usual rolling tool or even with a rolling tool which has been used for producing other screws. The self-centering function of the screw is associated with a separate centering portion being designed as a self-centering threaded portion. Preferably, the centering portion is arranged to be axially spaced apart from the "normal" first threaded portion and preferably in the region of the free end of the screw facing away from the head. However, it is also possible that this self-centering portion is arranged adjacent in an axial direction and directly next to the "normal" thread, respectively. The self-centering portion may also be located closer to the head, for example to arrange a cylindrical or a conical centering portion without a thread (a so called "dog point") in the region of the free end of the screw.

The self-centering threaded portion and its thread, respectively, has an outer diameter which is smaller than the outer diameter of the first threaded portion and of its thread, respectively. In contrast to the first thread, the thread crest of the second thread is designed to enlarged, meaning to be broader. Such a broader or enlarged shape according to the definition of the present application is to be understood as a more or less flat shape replacing the more or less sharp-edged shape of the usual thread crest. The design in the sense of a round thread is preferred. However, other designs—as for example a flattened shape—are also possible. In addition to the thread crest, the thread flanks may also have a rounded shape.

The second thread always has a different pitch than the first thread. In all embodiments of the novel screw, the first and the second threaded portion may be arranged in an axially spaced apart manner.

This novel special shape and arrangement of the novel self-centering threaded portion leads to elimination of undesired elastic and plastic deformation of the threads without substantially increasing the cost of manufacture of the screw. This undesired elastic and plastic deformation is caused by the phenomena of cross threading which e.g. results from transverse arrangement of the screw with respect to the thread of the corresponding component during the initial tightening process. With the novel screw, the second thread having a smaller outer diameter and a thread crest being enlarged and broadened, respectively, automatically enters the corresponding "normal" inner thread of the component in the correct relative arrangement during continued tightening. Displacement of half the pitch of the thread, as it may result from a transverse connection of the screw and the inner thread, is automatically eliminated during continued tightening of the threaded connection. This is achieved by the thread crest of the second threaded portion (which is broader and lower) elastically sliding over the thread crest of the "usual" inner thread of the component and into the correct impression in the corresponding inner thread.

As soon as the initial misalignment has been compensated and the tightening process is continued, one attains the advantage of the different pitches of the engaging threads. These different pitches lead to the effect that the play or clearance initially existing between the second thread and the corresponding inner thread of the component due to the decreased outer diameter of the second threaded portion being continuously decreased. In other words, the different pitches rather intend to get closer to the engaging threads getting jammed without ever actually reaching a jammed position of the threads, but instead reaching correct engagement of the "normal" first threaded portion and the corresponding inner thread of the component.

To be capable of producing the two separate threaded portions having different designs and functions in an economic way, the axial distance between the first and the second threaded portion—if available—especially corresponds to at least half the pitch of the first threaded portion. The distance may also be approximately at least the pitch and especially approximately twice the pitch or more. The axial distance ensures that the two threaded portions having different pitches and shapes are economically producible with separate tools.

Preferably, the second threaded portion has a greater pitch than the first threaded portion. This is advantageous since the second thread may then be designed as a robust round thread, for example, having a comparatively increased pitch. Such a round thread is less sensitive to damages. However, it is also possible to choose the pitch of the second threaded portion to be smaller than the pitch of the first threaded portion. In both cases, it is especially preferred to use a ratio between the pitches which is approximately between 1.02 to 1.5 . In combination with the proportions between the outer diameter and the flank diameter as well as the length of the second threaded portion, such a pitch ratio results in the desired reduction of clearance or play between the threads without the threaded connection actually getting jammed.

The core diameter of the first thread may be greater than the core diameter of the second thread. Both threaded portions may be produced separately and each in one step by rolling. The second threaded portion is produced on a shank portion having a smaller blank shank diameter than the portion in which the first threaded portion is produced by rolling. The diameters are especially chosen such that the first thread has a flank diameter being approximately identical to the second outer diameter of the second thread.

It is to be understood that the screw usually includes a head and a free end facing away from the head. The second threaded portion preferably is arranged in a way to face the free end, end the first threaded portion is arranged between the second threaded portion and the head. This generally corresponds to the usual general design of a screw. However, the screw may also be designed as a center collar screw, and/or it may include other portions and sections, for example another threaded portion or a press fit portion and the like.

The present invention also relates to a method of producing a self-centering screw. Initially, the so called wire serving to produce the screw blank is cold formed to produce a head, a first blank shank portion having a first diameter and a second blank shank portion having a second diameter. The first diameter is greater than the second diameter. A first threaded portion including first thread having a first outer diameter and a first pitch is rolled in the first blank shank portion. A second threaded portion including a second thread having a second outer diameter and a second pitch is rolled in the second blank shank portion. The second threaded portion is designed as a self-centering threaded portion. The second threaded portion includes a broadened thread crest. The second outer diameter of the second thread is smaller than the first outer diameter of the first thread. The first pitch of the first thread and the second pitch of the second thread are different.

The novel screw is especially made of steel. However, it could also be made of aluminum or other suitable materials, such as titan, for example. Especially, the screw is a high-tensile screw, for example for use in the automobile industry. The screw may include a rounded or conical dog point at its free end. The second thread may also have a discontinuous pitch.

The novel screw may be advantageously produced by rolling the first threaded portion with a first rolling tool and by rolling the second threaded portion with a second rolling tool. Thus, the rolling tools may be designed as separate tools, and they do not need to have a transition portion with which the complicated transition shape between the two threaded portions has to be produced, as it is known in the prior art. For example, the two tools may be combined to form one single tool by a screw connection and the like. In this way, there is the possibility of producing both threads in one simple step by rolling.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
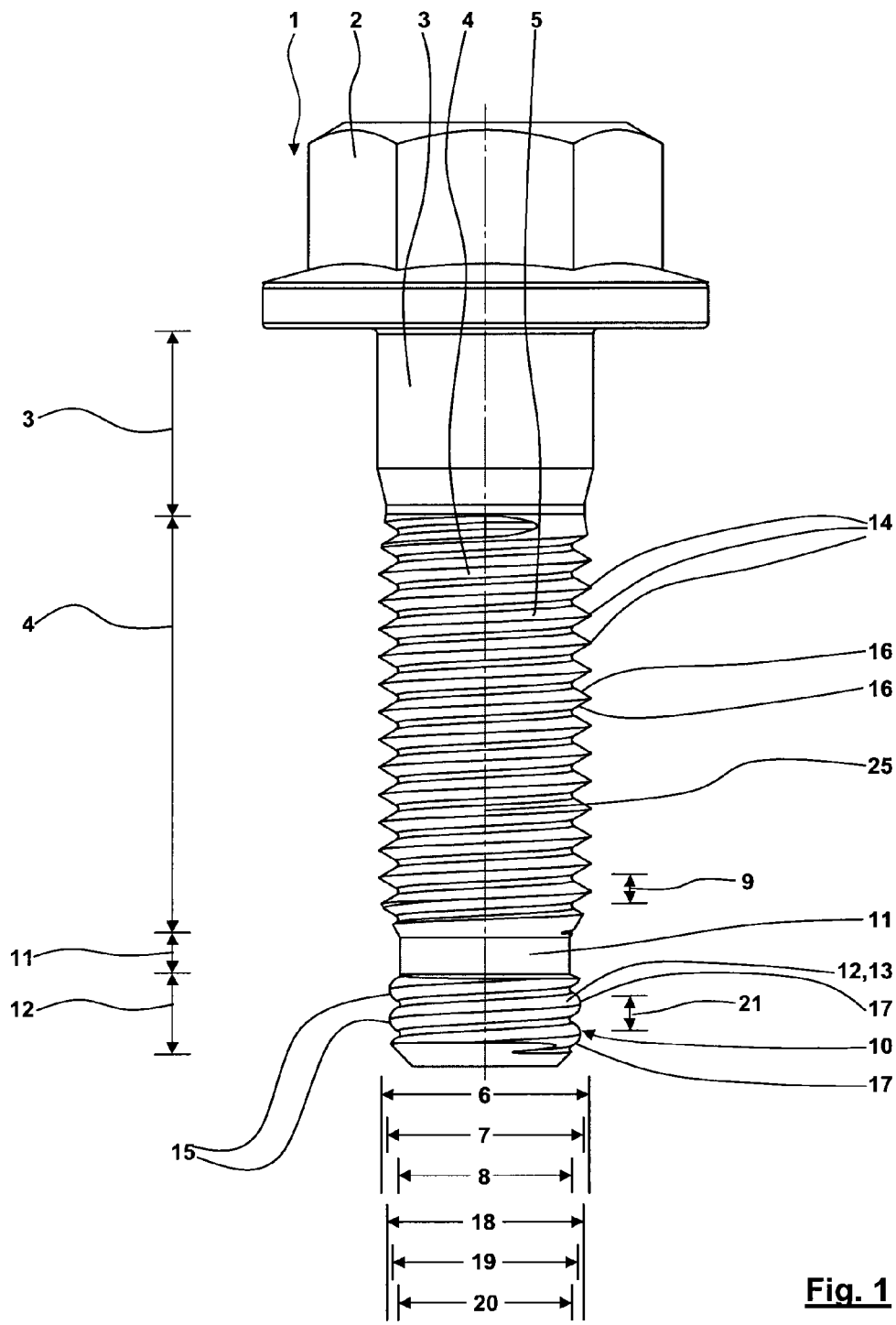
FIG. 1 is a side view of a first exemplary embodiment of the novel anti-cross threading screw.

FIG. 1 is a side view of a first exemplary embodiment of the novel anti-cross threading screw 1. The screw 1 includes a head 2, a shank portion 3 and a first threaded portion 4. The first threaded portion 4 includes a thread 5. In the illustrated example, the thread 5 is a metric thread having a usual design. The first thread 5 has a first outer diameter 6, a first flank diameter 7, a first core diameter 8, a first pitch 9, a first thread crest 14 and a first thread flank 16. The sharp-edged design of the thread crest 14 is illustrated in a slightly exaggerated manner. A shank portion 11 is located in a direction towards a free end 10 of the screw 1 facing away from the head 2.

The thread runout of a second threaded portion 12 including a second thread 13 is located next to the shank portion 11. In other words, the second threaded portion 12 is arranged such that it is axially spaced apart from the first threaded portion 4. The second thread 13 is designed to be continuous in a radial direction, meaning it continuously winds about the axis 25 of the screw 1. In contrast to the usual sharp-edged design of the thread crest 14 of the "usual" first thread 5, the thread crest 15 of the special second thread 13 is designed to be enlarged and broadened, respectively. In the illustrated example, it is designed to be rounded. As it is to be also seen in FIG. 1, in contrast to the straight thread flanks 16 of the first thread 5, the thread flanks 17 of the second thread 13 are also designed to be completely or partly rounded. The second thread 13 has a second outer diameter 18, a second flank diameter 19, a second core diameter 20 and a second pitch 21. The second outer diameter 18 is smaller than the first outer diameter 6, the second flank diameter 19 is smaller than the first flank diameter 7 and the second core diameter 20 is smaller than the first core diameter 8. The second pitch 21 is greater than the first pitch 9. However, the ratio of the pitches 9, 21 could also be opposite, meaning the second pitch 21 could be smaller than the first pitch 9.

The functionality of the novel screw 1 as an anti-cross threading screw or self-centering screw with the second threaded portion 12 serving as self-centering threaded portion is now further explained with reference to FIGS. 1, 2 and 3.

Figure 2:
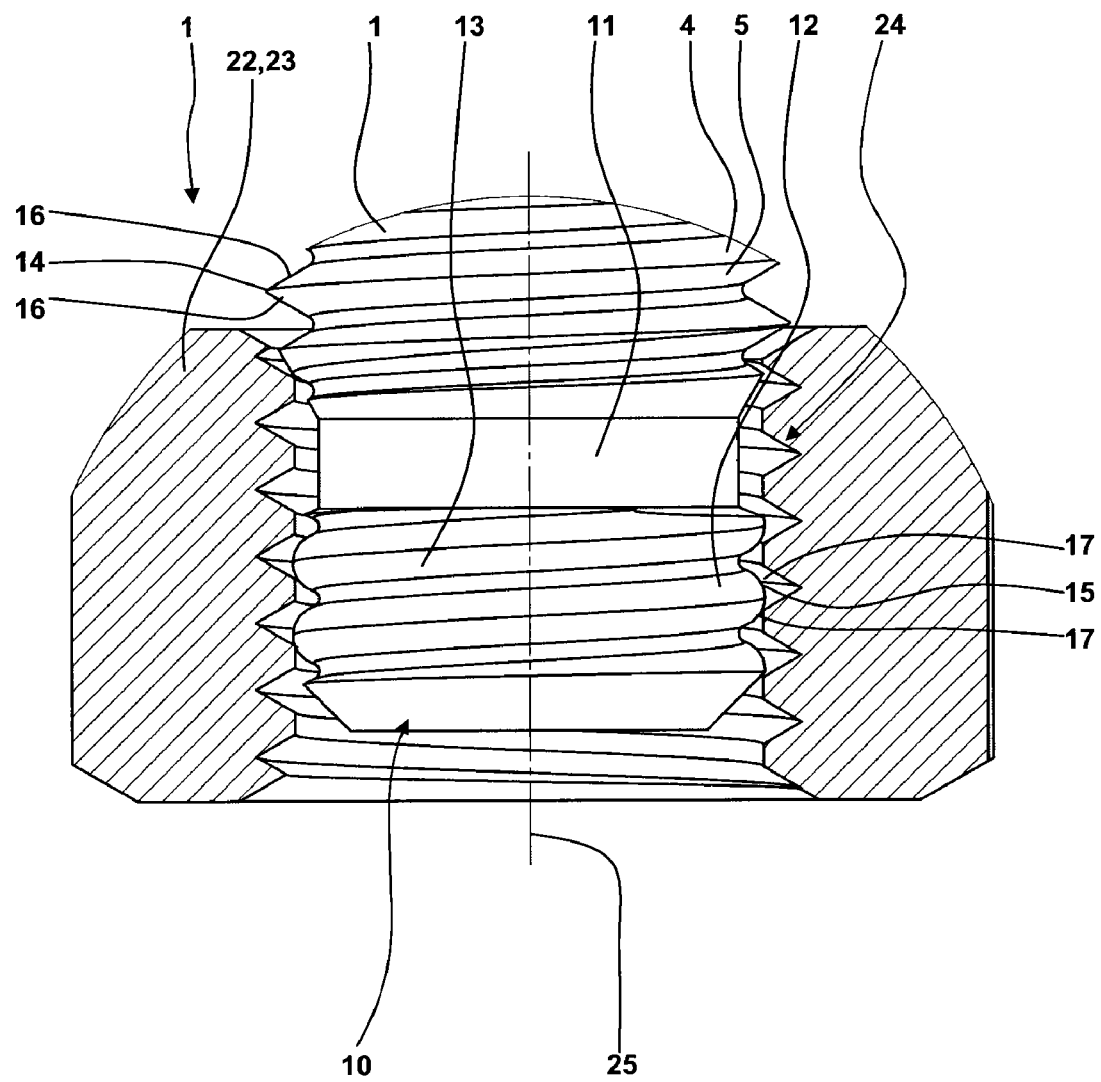
FIG. 2 is a side view of the screw according to FIG. 1 which has been screwed into an inner thread of a component.
Figure 3:
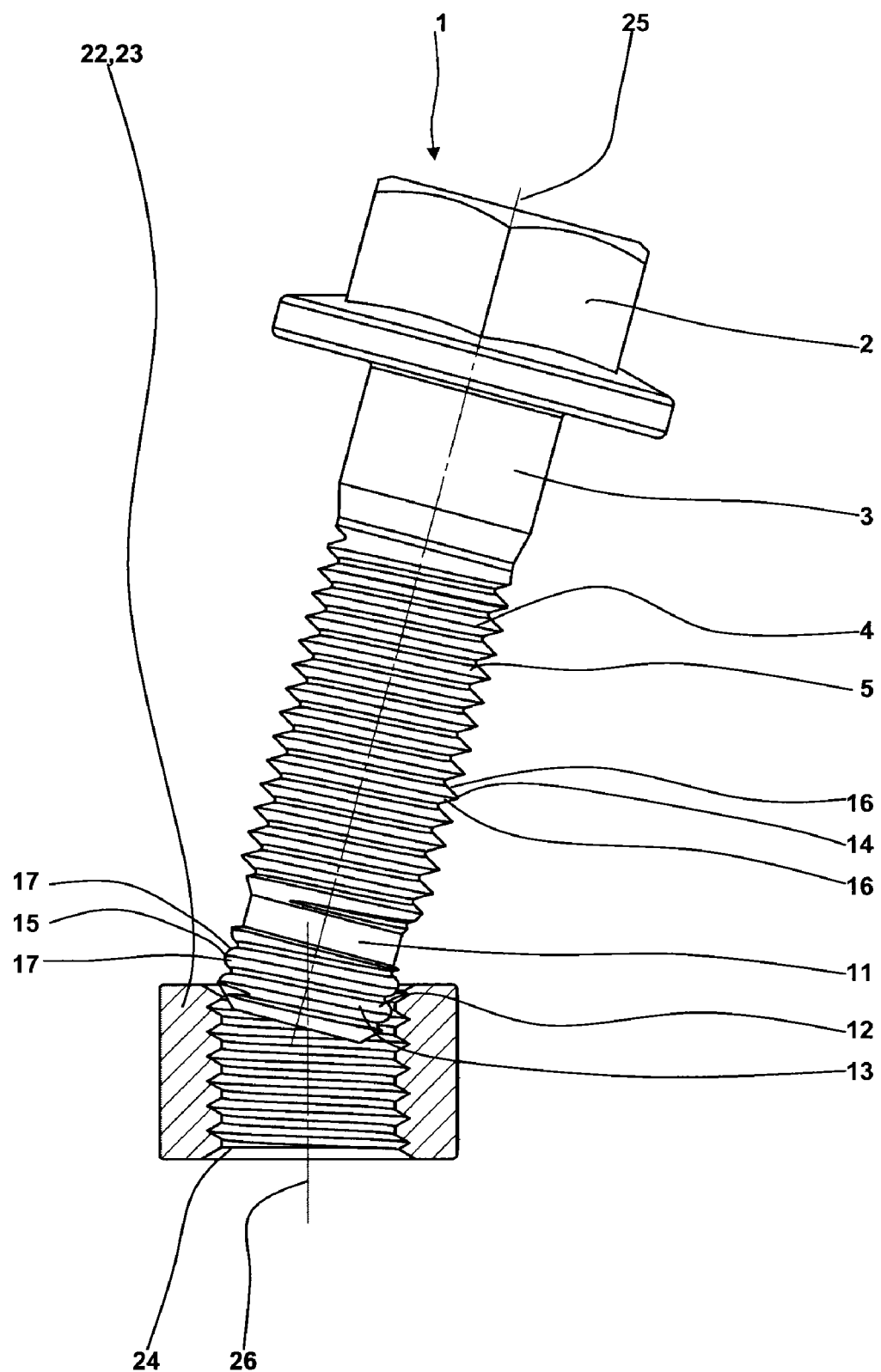
FIG. 3 is a partial sectional side view of the screw according to FIG. 1 which protrudes into a component with a misaligned orientation.

Not all reference numerals contained in FIG. 1 are also contained in FIGS. 2 and 3 for reasons of clarity of the drawings. This also logically applies to the other drawings. Consequently, with respect to many reference numerals, it is referred to FIG. 1. FIGS. 2 and 3 illustrate the cooperation of the self-centering screw 1 according to FIG. 1 with a corresponding component 22. The component 22 may be a nut 23 or any other component including an inner thread 24. The inner thread 24 is also a metric thread, and it is chosen to correspond to the first thread 5 for correct mutual engagement.

FIG. 3 illustrates the beginning of the process of the screw 1 being screwed into the inner thread 24 of the component 22. The screw 1 is misaligned with respect to the component 22, meaning it is located in a somewhat transverse direction. Consequently, the axis 25 of the screw 1 and the axis 26 of the component 22 do not coincide, but they are arranged at an angle of approximately 15° in this example. Consequently, the tread crest 15 and the thread flanks 17 of the second thread 13 at the beginning of the tightening process do not engage the correct corresponding impressions of the inner thread 24. This is especially illustrated in the right hand portion of FIG. 3. Due to the enlarged and rounded, respectively, design of the thread crest 15 of the thread 13 and the reduced second outer diameter 18, the thread crest 15 and the thread flanks 17 are however capable of sliding and moving, respectively, into the correct corresponding impression of the inner thread 24 during the continued tightening process. This movement takes place without plastic deformation occurring. Due to this process, the screw 1 is automatically aligned with respect to the component 22 such that the initial angle between the axes 25, 26 approaches an angle of 0°.

Due to the reduced second outer diameter 18 of the second thread 13, there now would be a comparatively greater play or clearance in the connection of the threads 12, 24. However, the fact that the first pitch 9 of the first thread 5 differs from the second pitch 21 of the second thread 13 effectively counteracts this play or clearance. During the continued screwing movement of the second threaded portion 12 into the inner thread 24, this pitch difference leads to the play or clearance being successively decreased. The pitch difference is chosen to be coordinated with the remaining dimensions of the threads 12, 24 such that the second threaded portion 12 can be fully screwed through the component 22 without seizing effects occurring. During this inward screwing process, the first thread 5 also engages the inner thread 25. Due to the fact that these two threads 5, 25 are coordinated with each other and thus have the same pitch, the actually desired threading connection is securely attained in this way. The additional pre-arranged threaded connection between the second thread 5 and the inner thread 24 also serves to align the screw 1 with respect to the component 22. In this way, when the first threaded portion 4 is screwed into the inner thread 24 of the component 22, none of the treads 5, 24 is damaged.

Figure 4:
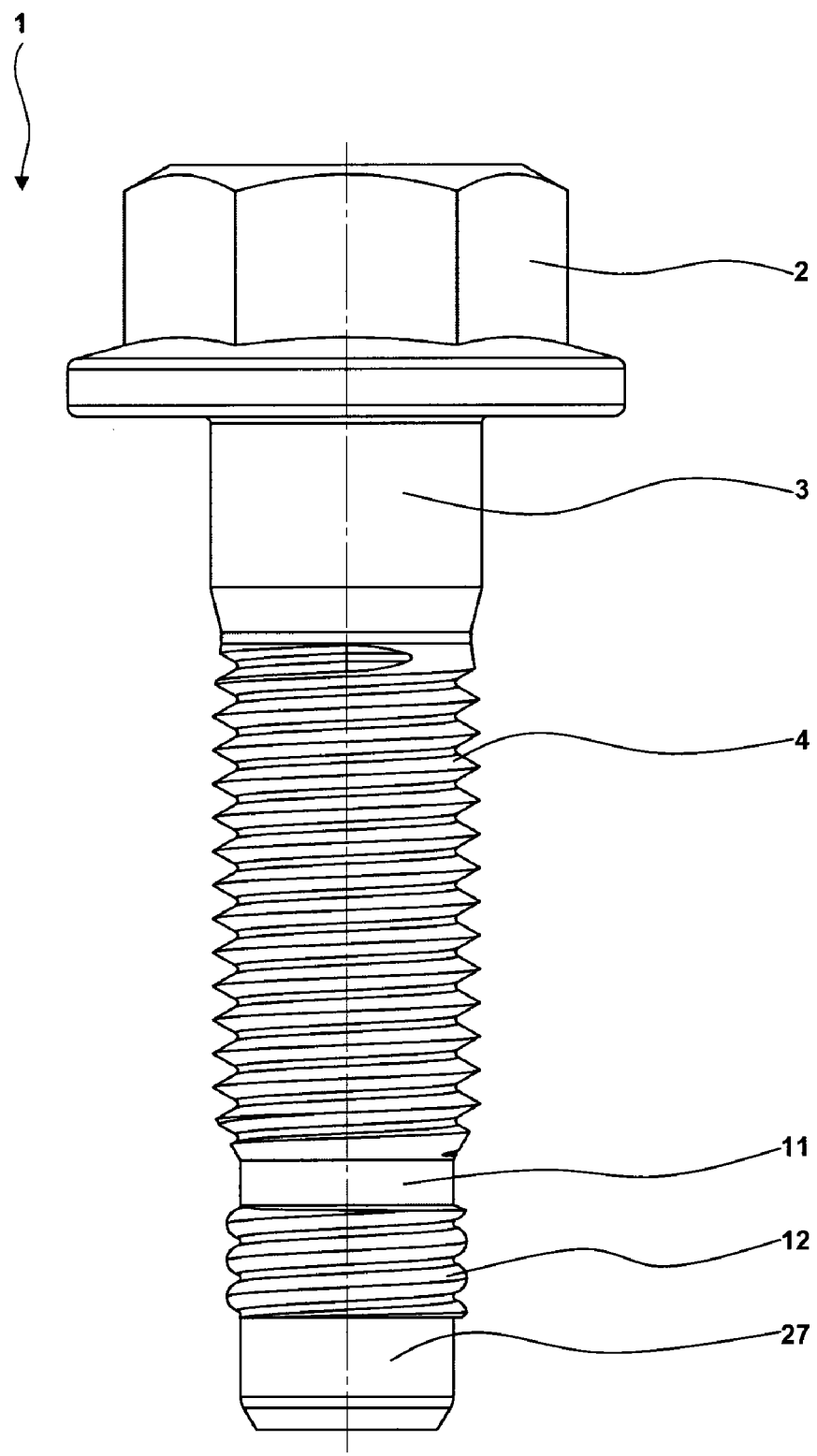
FIG. 4 is a side view of a second exemplary embodiment of the novel anti-cross threading screw.
Figure 5:
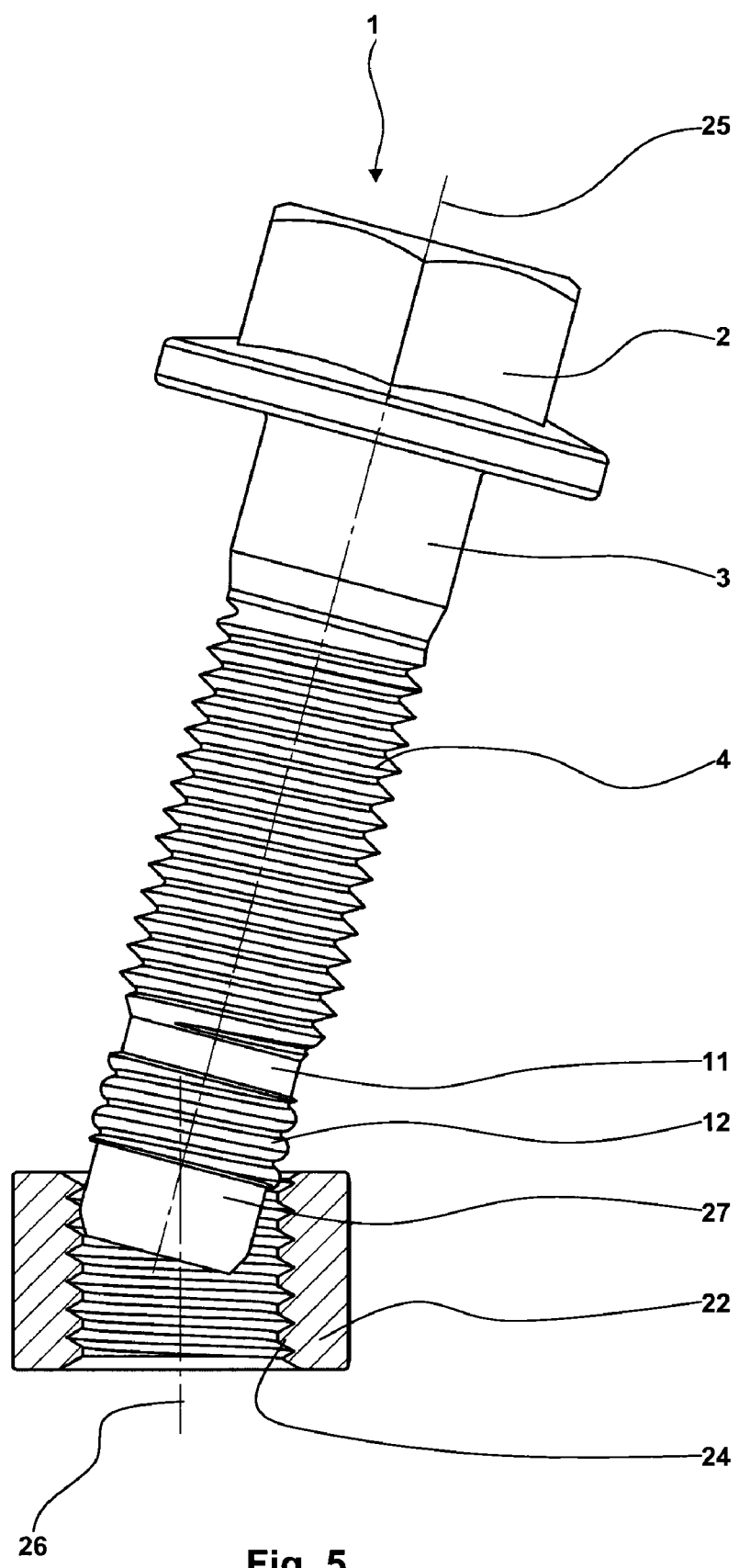
FIG. 5 is a partial sectional side view of the screw according to FIG. 4 which protrudes into a component with a misaligned orientation.

FIG. 4 is a side view of a second exemplary embodiment of the novel anti-cross threading screw 1. Due to the fact that this embodiment of the screw 1 has the same design as the embodiment of the screw 1 illustrated in FIG. 1 with respect to many aspects, it is referred to the above description concerning FIGS. 1-3. FIG. 4 also only contains the most important reference numerals and reference numerals referring to components which differ from FIGS. 1-3, respectively. In contrast to the embodiment of the screw 1 illustrated in FIG. 1, the embodiment of the screw 1 illustrated in FIG. 4 includes an additional dog point 27 being located in the region of the free end 10. At it is to be especially seen in FIG. 5, this dog point 27 or centering portion serves for initial alignment of the axis 25 of the screw 1 with respect to the axis 26 of the component 22 before the second threaded portion 12 with its thread 13 engages the inner thread 24.

Figure 6:
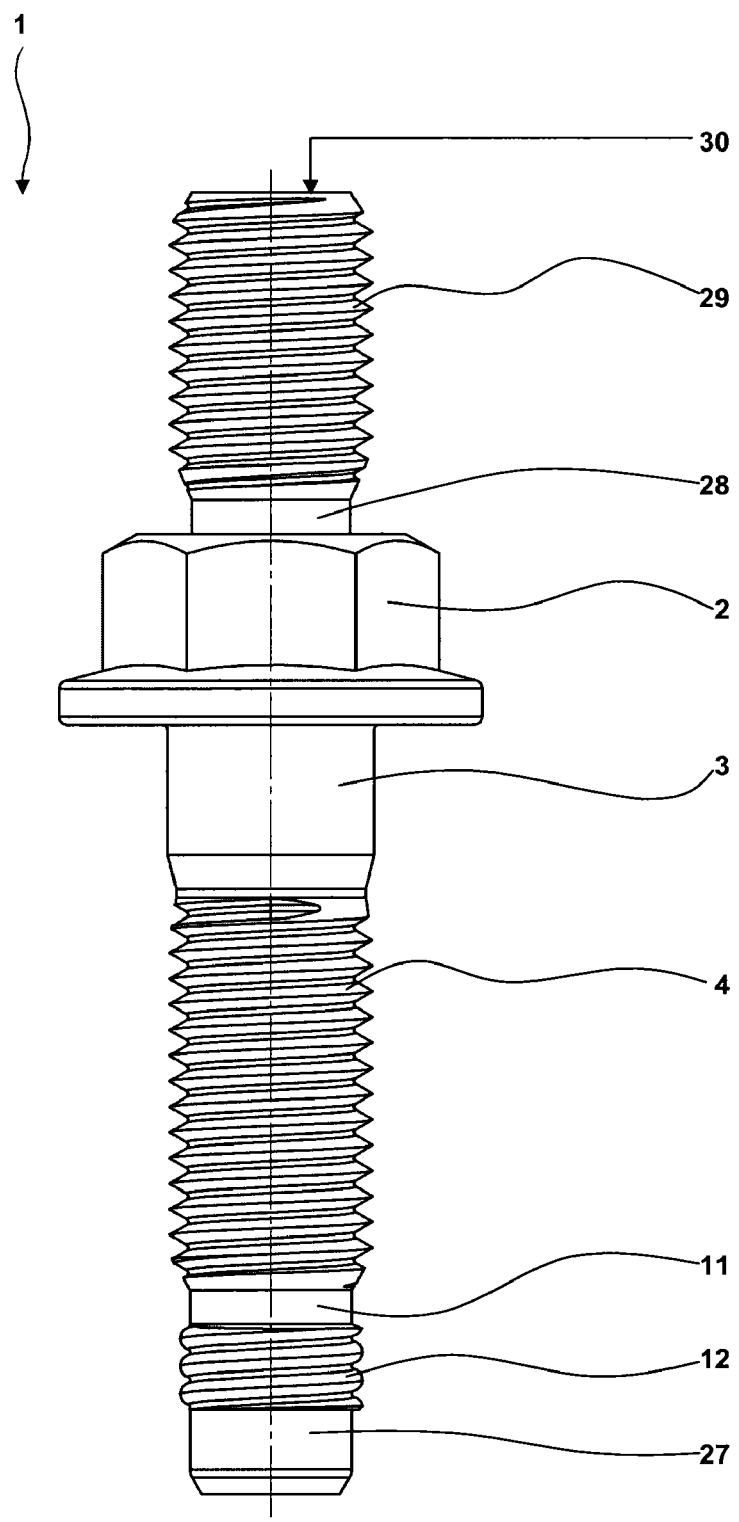
FIG. 6 is a side view of third exemplary embodiment of the novel anti-cross threading screw.

FIG. 6 illustrates a third exemplary embodiment of the novel anti-cross threading screw 1. The screw 1 illustrated in FIG. 6 is a so called center collar screw. Such a center collar screw does not end in the head 2 in one direction as it applies to the other embodiments of the screw 1, but it there includes another shank portion 28 and a third threaded portion 29. In the illustrated example, the third threaded portion 29 extends to the free end 30. It is to be understood that this third threaded portion 29 serves to cooperate with another inner thread of another component to attain another threaded connection. However, it is also possible to design this side of the center collar screw similar to the other side, meaning to include another shank portion followed by another threaded portion, the threaded portion being designed as a self-centering threaded portion similar or identical to the second threaded portion 12.

Figure 7:
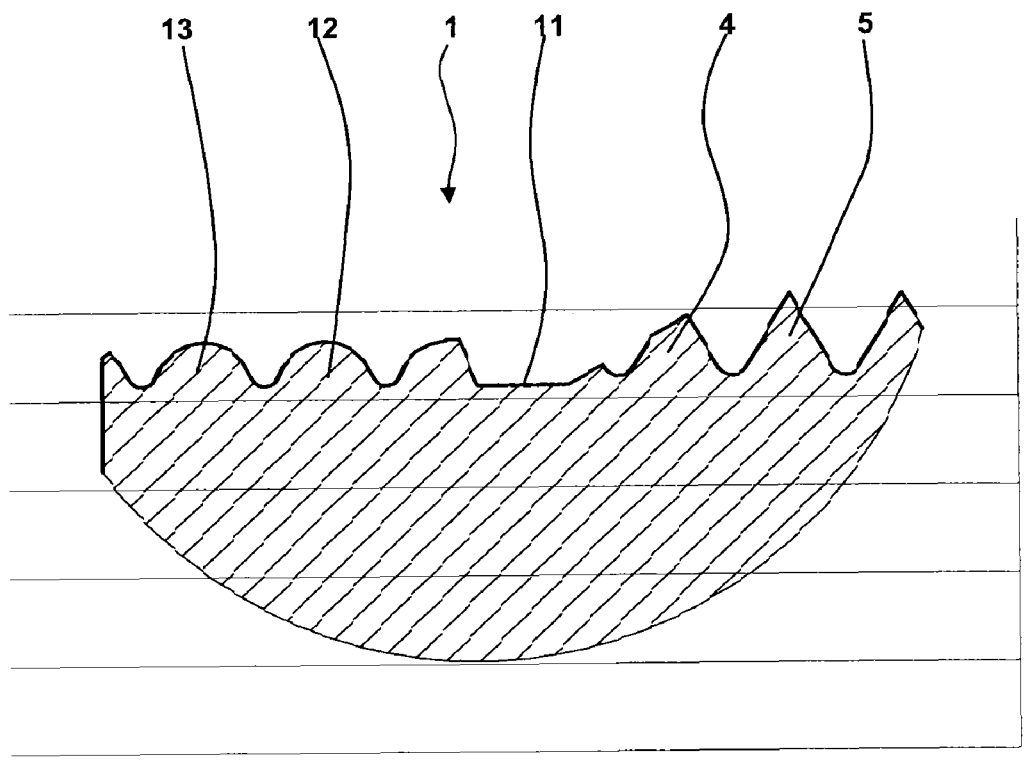
FIG. 7 is a sectional detailed view of a first exemplary embodiment of the two threaded portions of the novel screw and of the shank portion being arranged between the two threaded potions.

FIG. 7 illustrates an enlarged cross-sectional view of a part of a novel screw 1 showing a part of the first threaded portion 4, the second threaded portion 12 and the shank portion 11 being arranged therebetween. This illustration especially emphasizes the rounded shape of the second thread 12. It is to be noted that the very sharp-edged shape of the thread 5 is illustrated in an exaggerated manner. In reality, such a sharp-edged design cannot be produced by rolling. In FIG. 7, the axial length of the shank portion 11 corresponds to approximately half the pitch of the first thread 5 of the first threaded portion 4.

Figure 8:
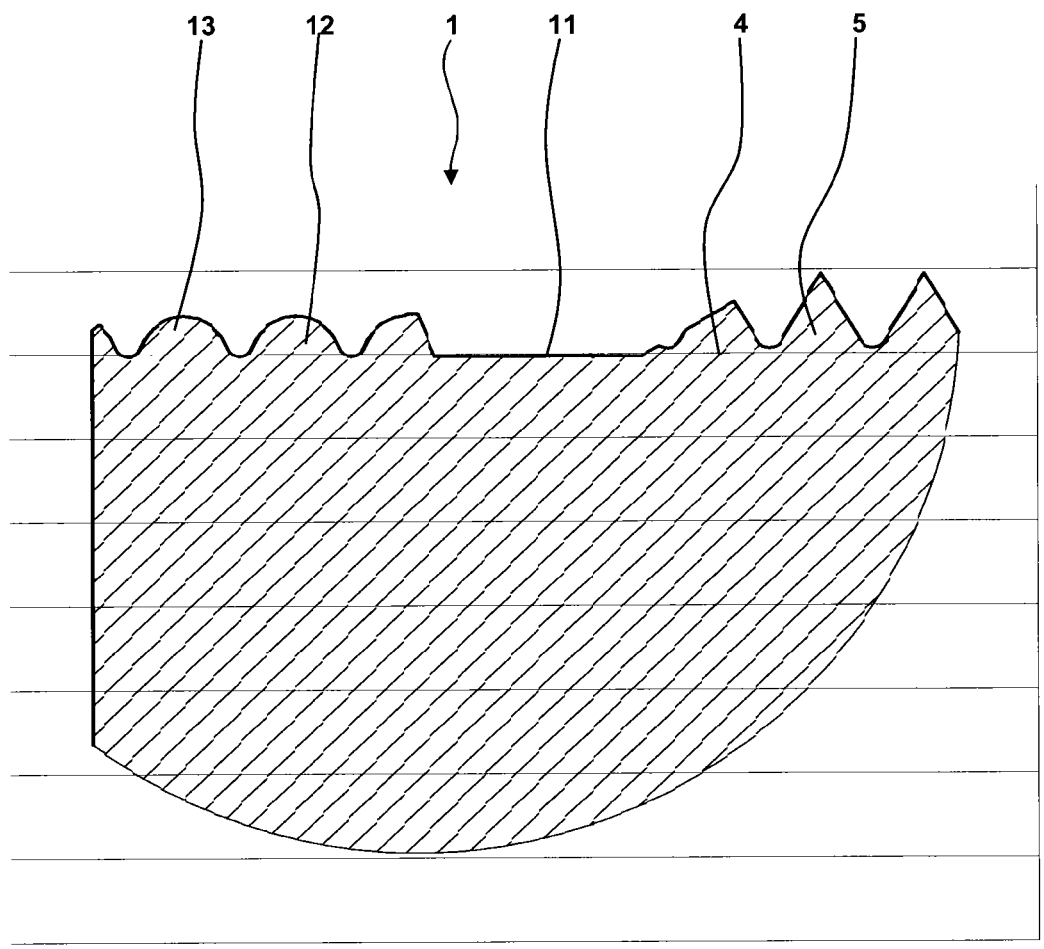
FIG. 8 is a sectional detailed view of a second exemplary embodiment of the two threaded portions of the novel screw and the shank portion being arranged between the two threaded potions.

FIG. 8 is a similar view as FIG. 7 illustrating another exemplary embodiment of the novel screw 1. In this embodiment, the axial length of the shank portion 11—meaning the axial distance between the first threaded portion 4 and the second threaded portion 12—is chosen to be greater. In this case, it is greater than the first pitch 9 of the first threaded portion 4. It is to be understood that it is also possible to use even greater axial distances or not to use such an axial distance at all.

Figure 9:
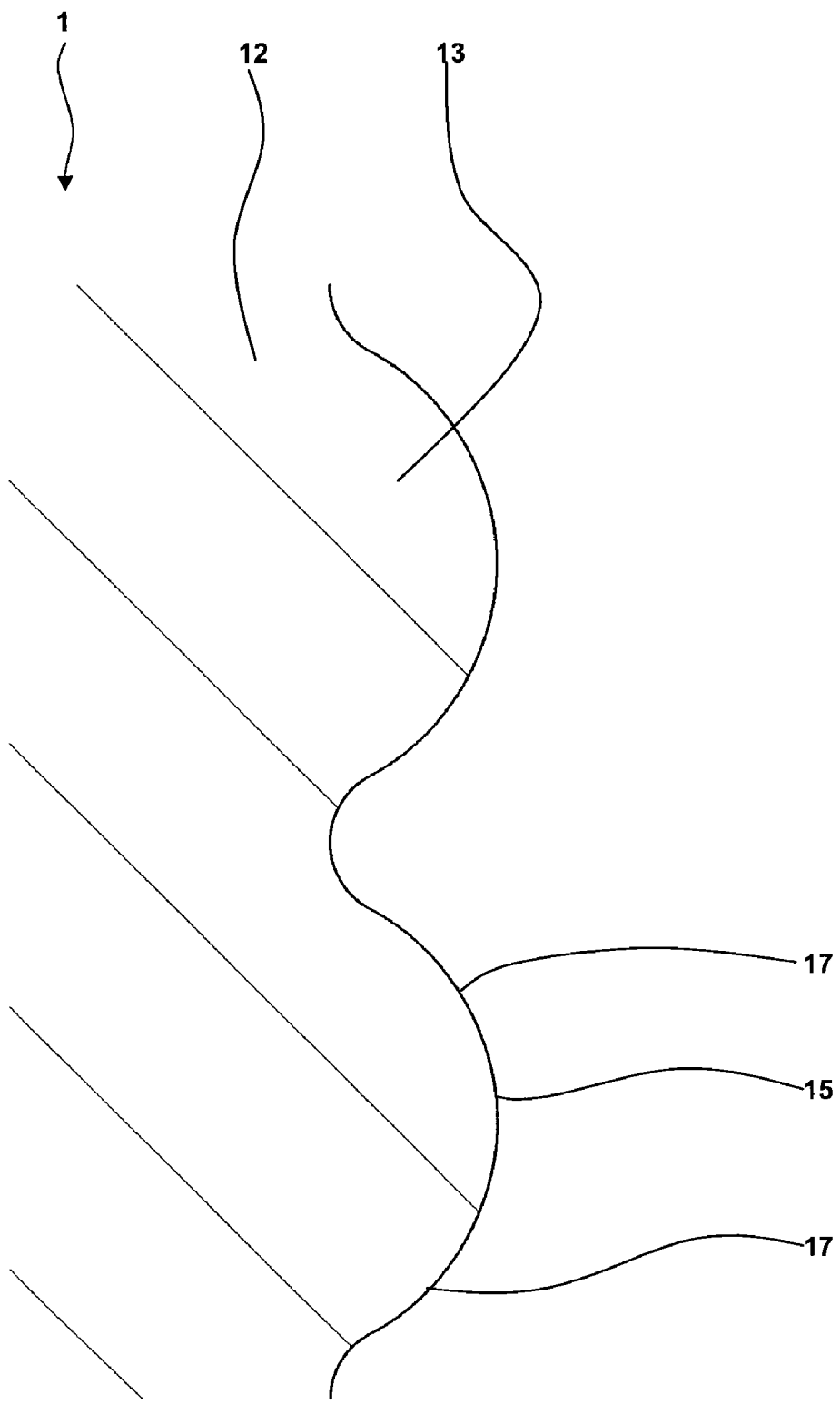
FIG. 9 is a sectional detailed view of the first exemplary embodiment of the second threaded portion of the novel screw.
Figure 10:
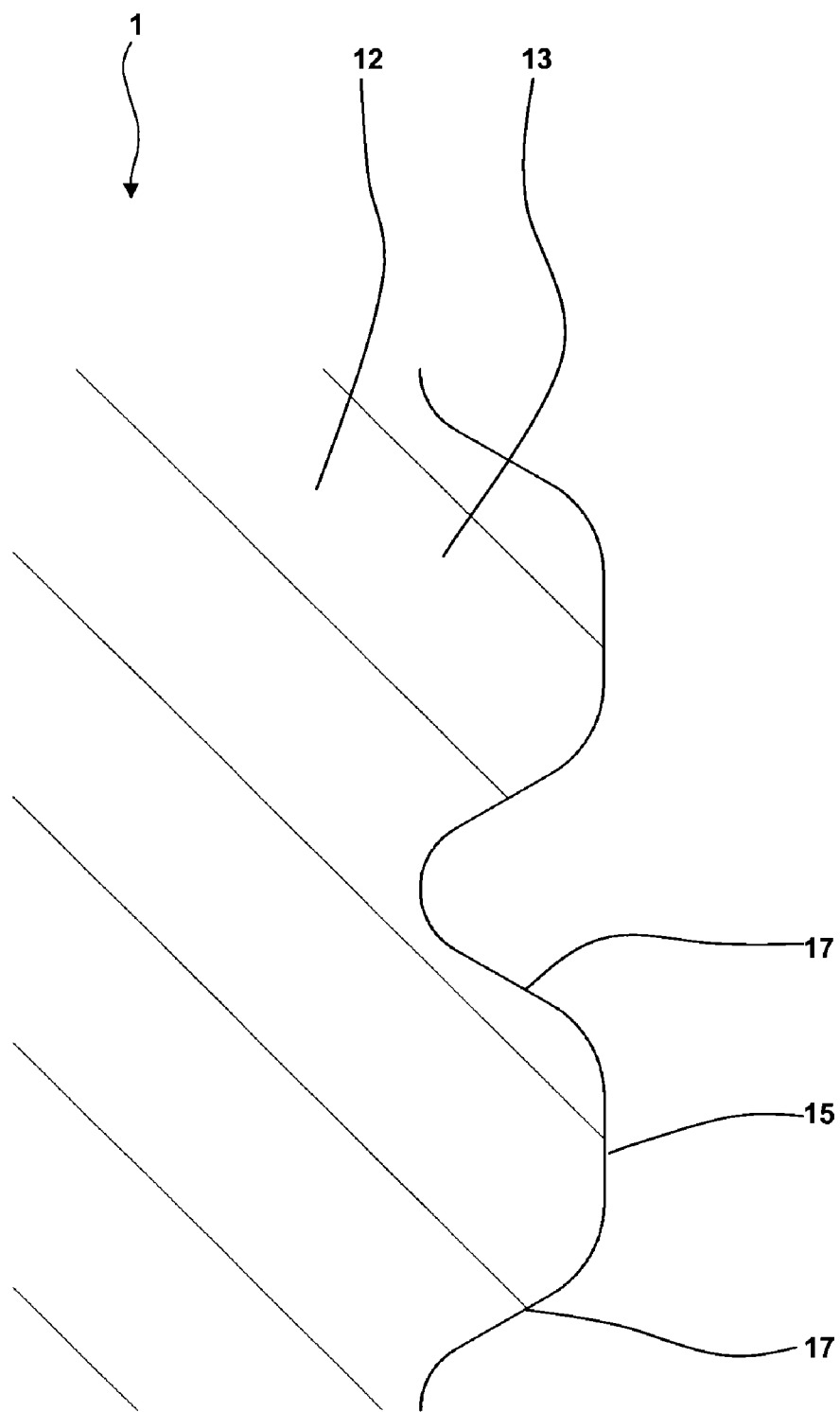
FIG. 10 is a sectional detailed view of a second exemplary embodiment of the second threaded portion of the novel screw.
Figure 11:
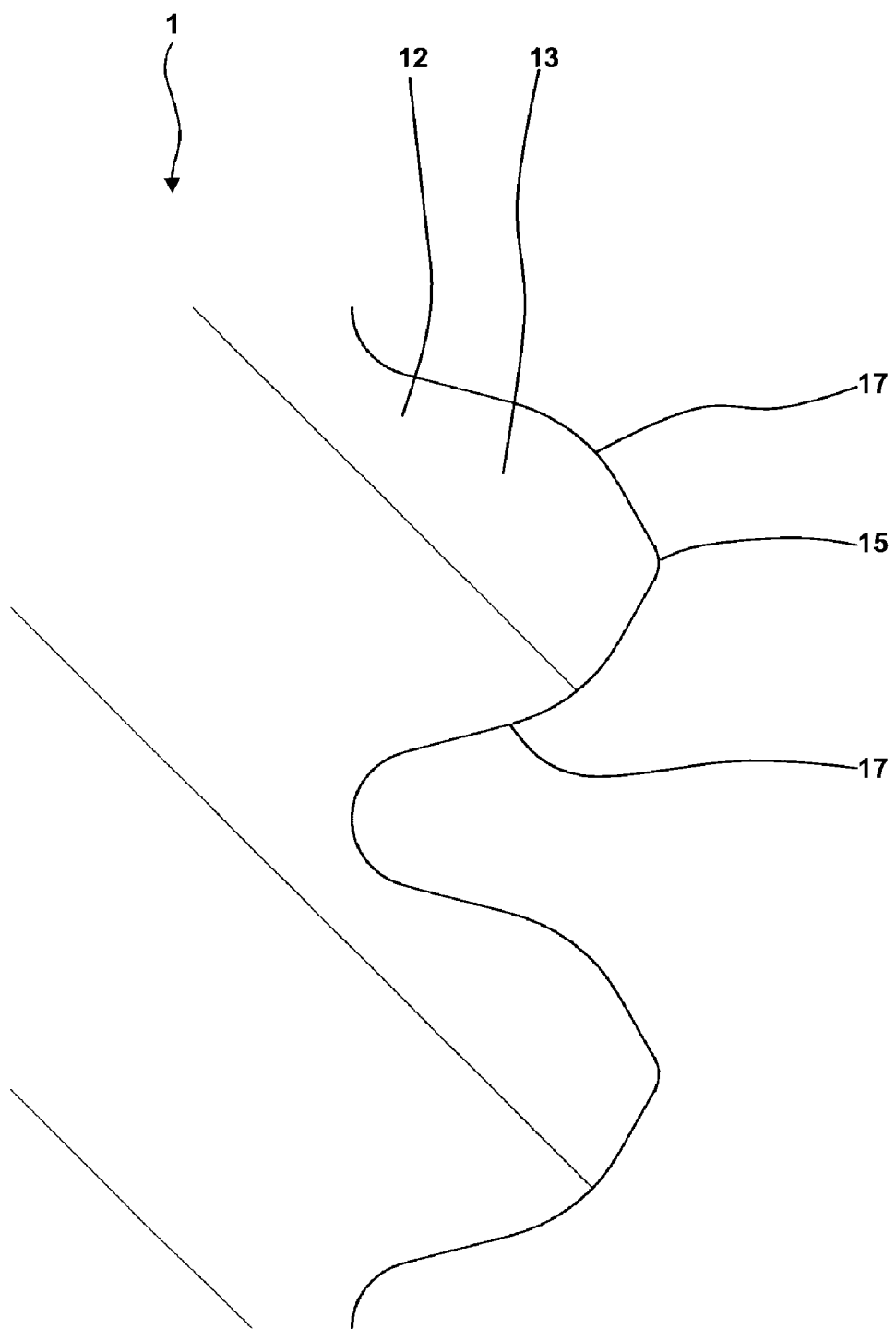
FIG. 11 is a sectional detailed view of a third exemplary embodiment of the second threaded portion of the novel screw.
Figure 12:
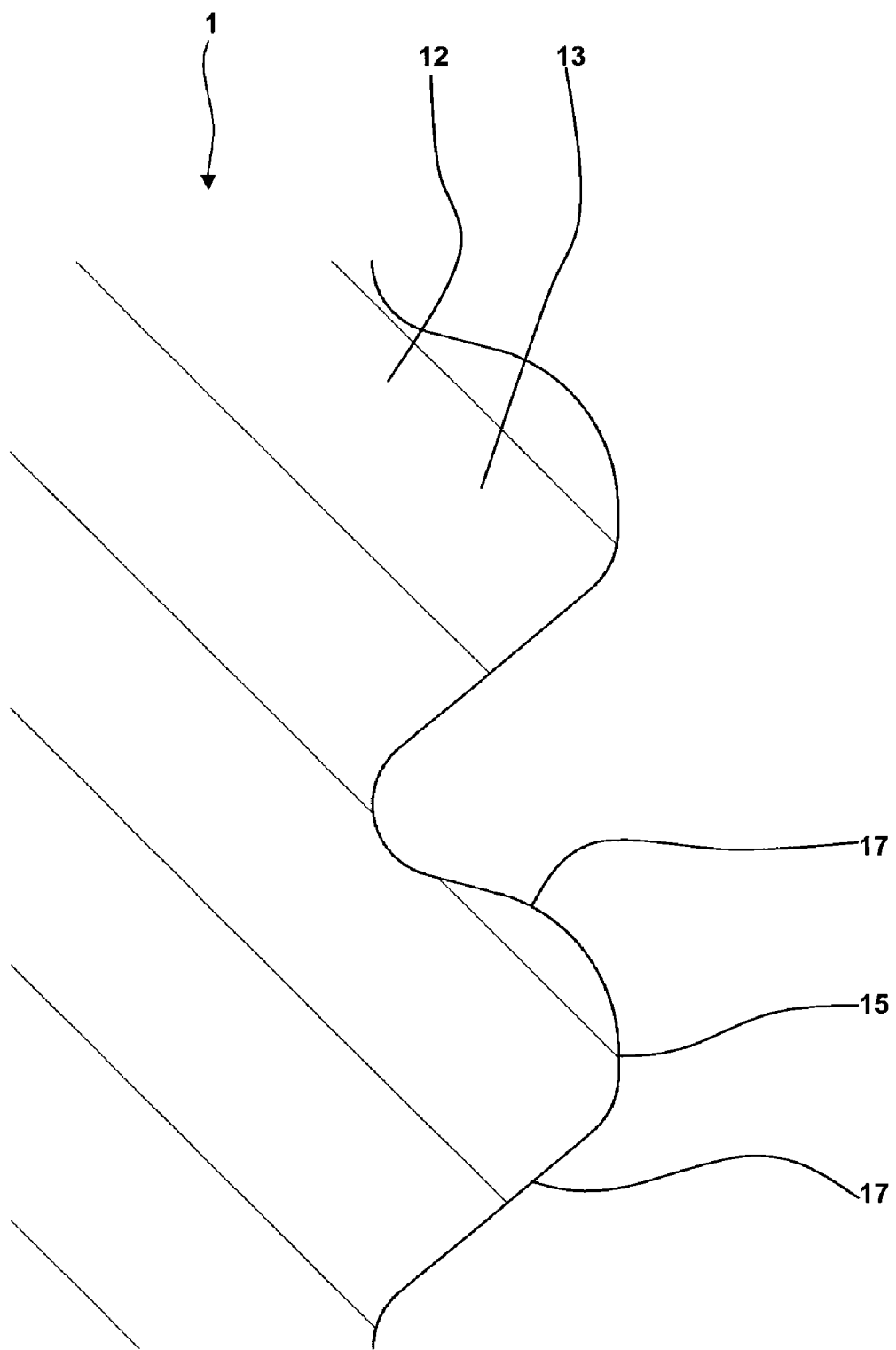
FIG. 12 is a sectional detailed view of a fourth exemplary embodiment of the second threaded portion of the novel screw.

FIGS. 9-12 illustrate sectional detailed views of exemplary embodiments of the second threaded portion 12 including the thread 13. FIG. 9 shows a comparatively uniform rounded shape in the protruded portions of the thread 13. The ideal rounded shape (for illustration purposes only) of the protruding portions is greater than the radius of the recess portions (or impressions) of the thread 13. The thread crest 15 as well as the thread flanks 17 have a continuous round shape. The embodiment of the screw 1 according to FIG. 10 includes a plateau-like flattened thread crest 15. Such a flattened design is also to be understood as an enlarged thread crest 15 as used in the present application. Further exemplary embodiments of the thread crest 15 and of the thread flanks 17 are illustrated in FIGS. 11 and 12. The thread 13 may be a round thread or a different thread having a thread crest 15 being enlarged such that it is not as sharp-edged as the thread crest of a "usual" thread.

Figure 13:
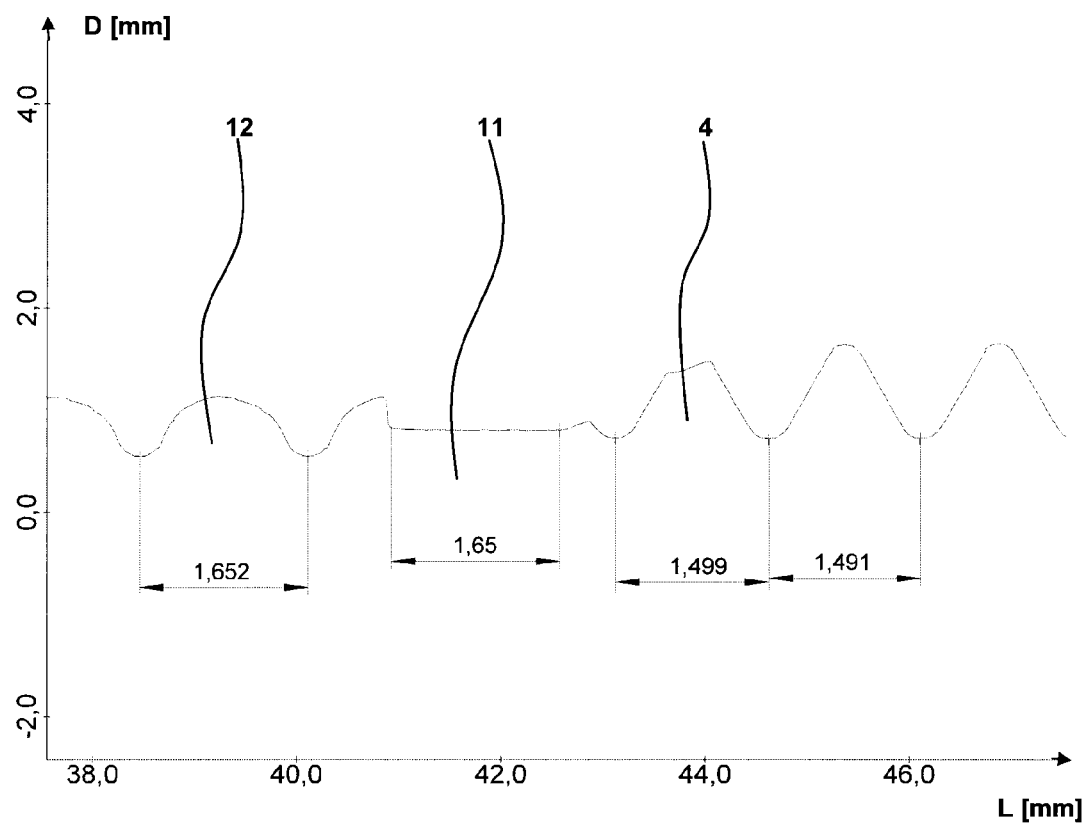
FIG. 13 is a view illustrating a measuring result of concrete dimensions of a practical example of the screw designed as a M123×1.5 screw.

FIG. 13 illustrates a measuring result of the dimensions of a novel screw 1 according to a practical M12×1.5 screw. The first metric thread 5 has a pitch 9 of approximately 1.5 mm. The following shank portion 11 has a length of approximately 1.7 mm. The second pitch 21 of the second metric thread 13 is approximately 1.65 mm. The first outer diameter 6 of the first thread 5 is approximately 12.0 mm as it is usual for a M12 screw. The reduced second outer diameter 18 of the second thread 13 is approximately 10.7 mm and has a length of approximately 9 mm.

Figure 14:
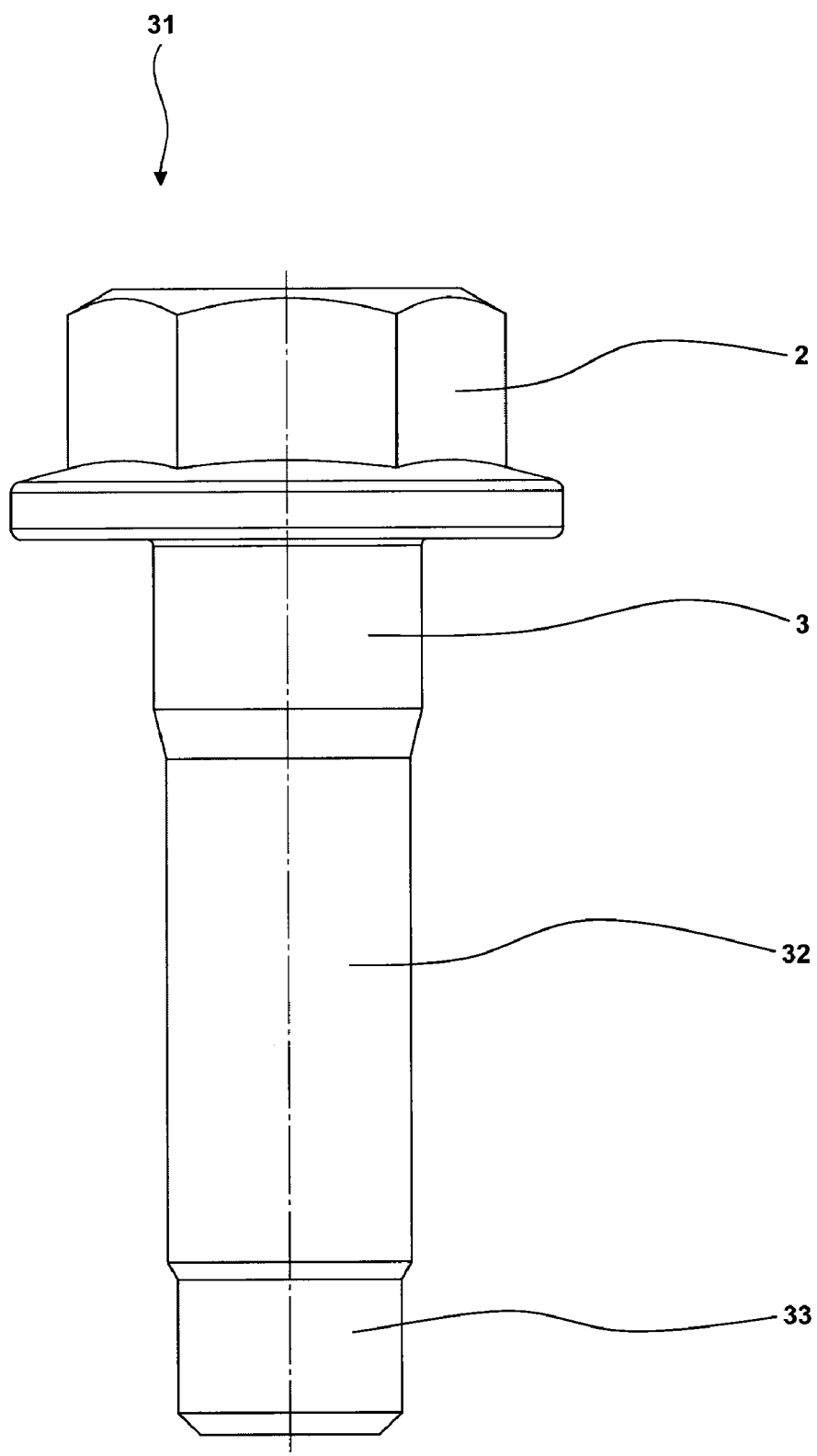
FIG. 14 is a side view of a screw blank being associated with the screw according to FIG. 1.

FIG. 14 illustrates a side view of a screw blank 31 corresponding to the screw 1 according to FIG. 1. Such a screw blank 31 is produced from so called wire by cold forming. The screw blank 31 includes the head 5, a first blank shank portion 32 with a first diameter and a second blank shank portion 33 having a second diameter, the first diameter being greater than the second diameter. It does not include a third shank portion. Starting from the screw blank 31, the first threaded portion 4 with the first thread 5 (see FIG. 1) is produced in the first blank shank portion 32 by rolling. Furthermore, the second threaded portion 12 with the second thread 13 (see FIG. 1) is produced in the second blank shank portion 33 by rolling.

Figure 15:
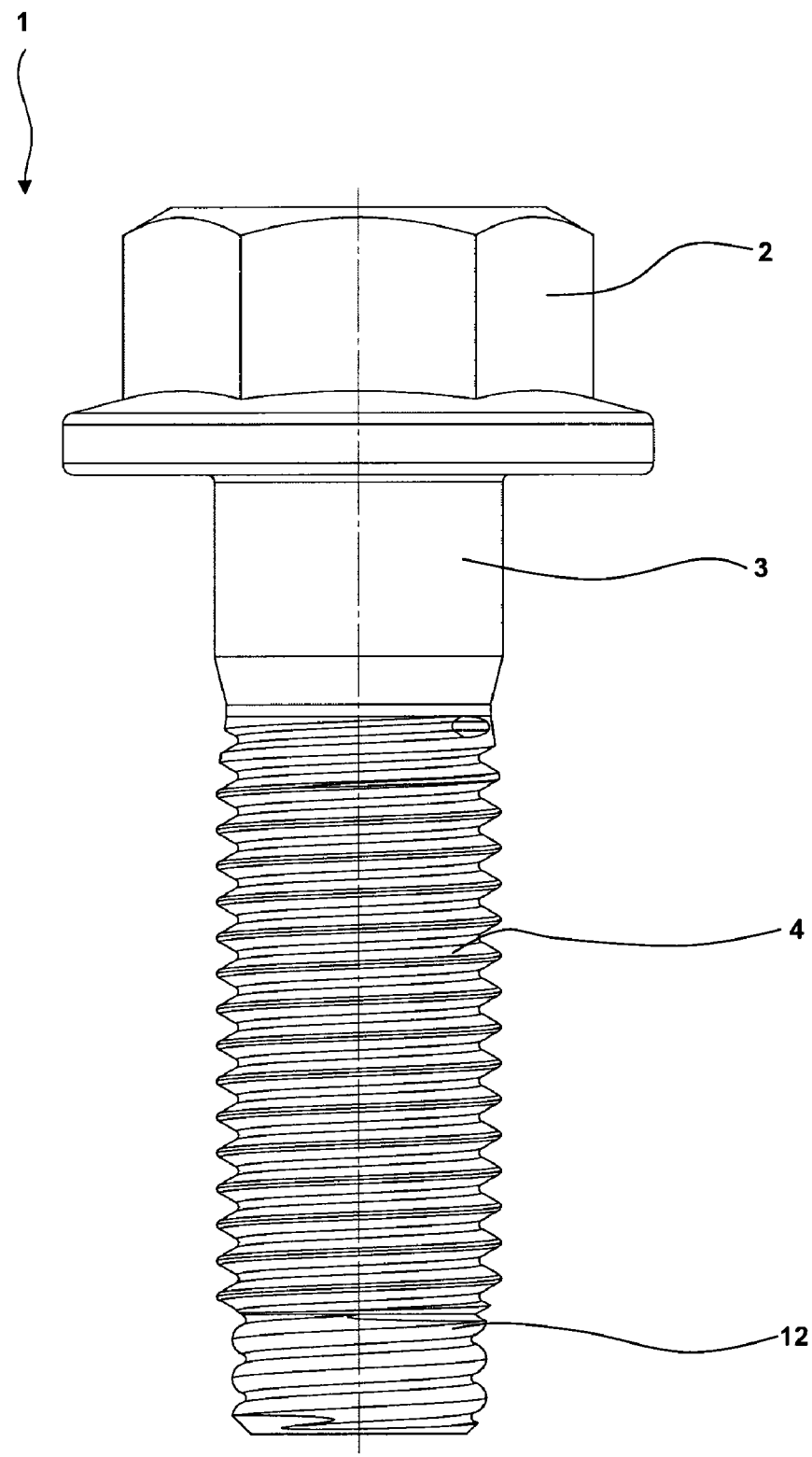
FIG. 15 is a side view of a forth exemplary embodiment of the novel anti-cross threading screw.

FIG. 15 illustrates a side view of a forth exemplary embodiment of the novel anti-cross threading screw 1. Due to the fact that this screw 1 with respect to most aspects corresponds to the embodiment of the screw 1 illustrated in FIG. 1, it is referred to the above description with respect to FIGS. 1-3. In case of the embodiment of the screw 1 illustrated in FIG. 15, the second threaded portion 12 is located directly next to the first threaded portion 4, meaning with no axial distance. However, the threads 5, 13 also have different pitches 9, 21.

Many variations and modifications may be made to the preferred embodiments of the invention without departing substantially from the spirit and principles of the invention. All such modifications and variations are intended to be included herein within the scope of the present invention, as defined by the following claims.

I claim:

1. A screw, comprising:
   a first threaded portion including a first thread having a first outer diameter, a first thread crest, and a first pitch;
   a second threaded portion having a second thread having a second outer diameter, a second thread crest, and a second pitch,
   said second threaded portion being designed as an anti-cross threading portion,
   said second thread crest of said second thread being enlarged compared to said first thread crest of said first thread,
   said second thread crest of said second thread being designed to have a round shape,
   said second outer diameter of said second thread being smaller than said first diameter of said first thread, and
   said first pitch of said first thread being different than said second pitch of said second thread.

2. The screw of claim 1, wherein said first threaded portion and said second threaded portion are arranged in an axially spaced apart manner such that there is an axial distance between said first threaded portion and said second threaded portion.

3. The screw of claim 2, wherein the axial distance between said first threaded portion and said second threaded portion corresponds to at least half the pitch of said first thread of said first threaded portion.

4. The screw of claim 3, wherein the second pitch of said second thread is greater than the first pitch of said first thread.

5. The screw of claim 2, wherein the second pitch of said second thread is greater than the first pitch of said first thread.

6. The screw of claim 1, wherein the second pitch of said second thread is greater than the first pitch of said first thread.

7. The screw of claim 6, wherein a ratio between the second pitch and the first pitch is approximately between 1.02 to 1.5.

8. The screw of claim 1, wherein a ratio between the second pitch and the first pitch is approximately between 1.02 to 1.5.

9. The screw of claim 1, wherein said first thread has a first core diameter and said second thread has a second core diameter, said first core diameter being greater than said second core diameter.

10. The screw of claim 1, wherein said first thread has a first pitch diameter being approximately identical to said second outer diameter of said second thread.

11. The screw of claim 1, wherein said second thread includes flanks having a round shape.

12. The screw of claim 1, further comprising a head and a free end facing away from said head, said second threaded portion being arranged to face said free end and said first threaded portion being arranged between said second threaded portion and said head.

13. An anti-cross threading screw, comprising:
    a head;
    a shank being connected to said head and having a free end facing away from said head,
    a first threaded portion including a first thread having a first outer diameter, a first thread crest, and a first pitch;
    a second threaded portion having a second thread having a second outer diameter, a second thread crest, and a second pitch,
    said second threaded portion being arranged to face said free end,
    said first threaded portion being arranged between said second threaded portion and said head,
    said second threaded portion being designed as an anti-cross threading portion,
    said second thread crest of said second thread being enlarged compared to said first thread crest of said first thread,
    said thread crest of said second thread being designed to have a round shape,
    said second outer diameter of said second thread being smaller than said first diameter of said first thread, and
    said first pitch of said first thread being different than said second pitch of said second thread.

14. The screw of claim 13, wherein said first threaded portion and said second threaded portion are arranged in an axially spaced apart manner such that there is an axial distance between said first threaded portion and said second threaded portion.

15. The screw of claim 13, wherein a ratio between the second pitch and the first pitch is approximately between 1.02 to 1.5.

16. A screw, comprising:
    a first threaded portion including a first thread having a first outer diameter, a first thread crest and a first pitch;
    a second threaded portion having a second thread having a second outer diameter, a second thread crest and a second pitch,
    said second threaded portion being designed as an anti-cross threading portion,
    said second thread crest of said second thread being enlarged compared to said first thread crest of said first thread,
    said thread crest of said second thread being designed to have a flat shape,
    said second outer diameter of said second thread being smaller than said first diameter of said first thread, and
    said first pitch of said first thread being different than said second pitch of said second thread.

17. The screw of claim 16, wherein a ratio between the second pitch and the first pitch is approximately between 1.02 to 1.5.

18. The screw of claim 16, wherein said first thread has a first core diameter and said second thread has a second core diameter, said first core diameter being greater than said second core diameter.

19. The screw of claim 16, wherein said first thread has a first pitch diameter being approximately identical to said second outer diameter of said second thread.

* * * * *